United States Patent Office 3,841,942
Patented Oct. 15, 1974

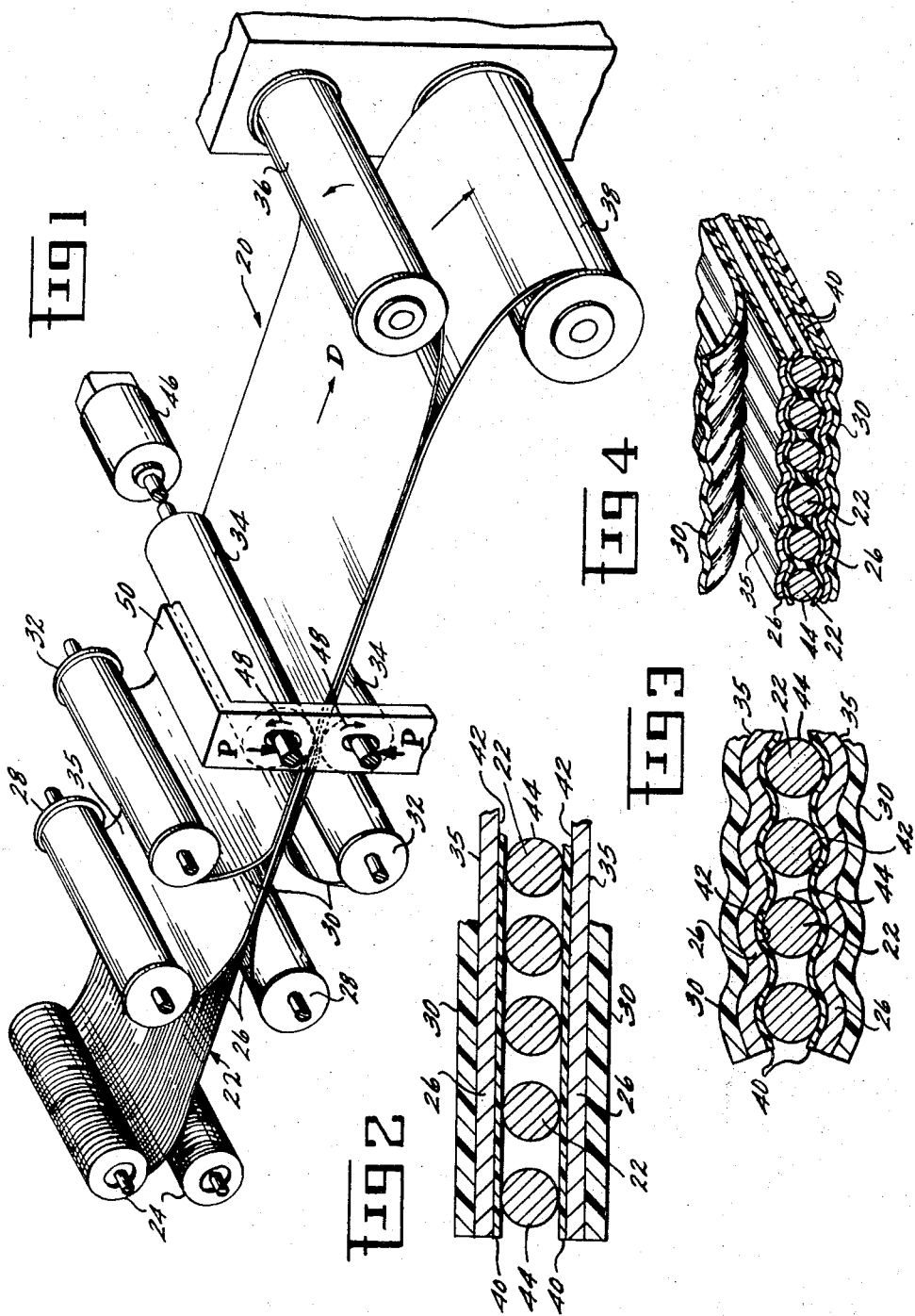

3,841,942
APPARATUS FOR FORMING A COMPOSITE METALLIC PREFORM TAPE
Robert G. Carlson and Carl A. Steinhagen, Cincinnati, Ohio, assignors to General Electric Company
Original application Apr. 12, 1971, Ser. No. 133,207, now Patent No. 3,719,538. Divided and this application Dec. 4, 1972, Ser. No. 311,814
Int. Cl. B32b 31/06, 31/20; B65h 54/00
U.S. Cl. 156—436
3 Claims

ABSTRACT OF THE DISCLOSURE

A composite metallic preform tape for use as laminae in the manufacture of metallic composite articles is made from a pair of metallic foils and high strength, high modulus filaments aligned between the foils. One form of the method involves first coating either the foil inner surfaces or the filament outer surfaces, or both, with a thin, nonmetallic adhesive bonding material which will decompose leaving substantially no residue upon heating at a temperature below that at which the foil and filaments will melt, and preferably below that at which they will bond together. The foil and the aligned filaments are themselves aligned and, in a continuous form of the method, are moved at substantially the same rate and in the same direction so that the coated surface is between the foil and filaments. At the same time, the foil and filaments are pressed toward one another with a force sufficient to adhesively bond together the foil and filaments and to plastically deform the foil around at least a portion of substantially each filament.

In a preferred form, at least one plastically deformable, strippable outer film is applied for protection and, if desired, for a quality control record. Deformation of the foils arount at least a portion of substantially each filament results in an article having a sandwich construction including centrally aligned filaments maintained in spaced apart relationship.

---

This is a divisional application of application Ser. No. 133,207 filed Apr. 12, 1971, now U.S. Pat. No. 3,719,538, and assigned to the assignee of the present invention.

BACKGROUND OF THE INVENTION

This invention relates to a composite metallic tape and, more particularly, to such a tape a plurality of which are used as laminae in the manufacture of a metallic composite article. More specifically, such a tape is considered to be a preform in respect to its ultimate use as an element of an article.

Requirements for strong lightweight metallic articles, particularly for use in aerospace applications, has resulted in increasing developments in the area of fiber reinforced metallic composites. One method used in the manufacture of composite articles involves the fabrication of the article from a plurality of reinforced sheets or tapes first stacked one upon the other to build thickness. Then the article is provided by subsequent pressing, heating, shaping, machining, grinding, etc. as required.

Such materials as aluminum, titanium and their alloys have been of particular interest as a matrix material for such composites because of their relatively low density. Reinforcement of such a matrix has been provided by high strength, high modulus filaments. One example is the filament referred to as "uncoated" boron filament, generally involving a tungsten filament substrate on which boron has been deposited pyrolytically. Another example is the so-called "coated" boron filament involving further application of coatings, for example carbides, nitrides, etc. Other examples include filaments such as of silicon carbide, carbon, graphite, $Al_2O_3$, etc.

The use of composite metallic material for the manufacture of articles has been shown to offer mechanical property improvements such as strength and modulus in proportion to the material's density when compared to homogeneous metal alloys, within the temperature limitations of such material. It has been shown that significant advantages can be attained by utilizing such property improvements for a variety of mechanically loaded components for jet engine and aircraft applications where the temperature environment permits the use of such composites.

One important facet in the fabrication of metal composite articles is the type and condition of the sheet or tape forming the laminae of such an article. The formation of a partially consolidated, thin tape permits greater latitude in forming such complex composite structures as compressor vanes and blades. There have been reported several processes for fabricating filament reinforced metallic tapes. These include the plasma spray application of matrix metal to the filaments, continuous casting of the matrix metal around the filaments and the use of a centrally located carrier foil to carry multiple layers of filaments sandwiched between cover foils. However, such known processes present problems relating to thickness variations in the tape, requirements for higher processing temperatures leading to property degradation and variation, or relatively low volume percent of filament in the matrix.

SUMMARY OF THE INVENTION

It is a principal object of the present invention to provide an improved composite metallic tape by a method which provides a single layer of a plurality of aligned high strength, high modulus filaments in a sandwich construction to result in a higher volume percent of filaments in the matrix and an easily handled tape.

Another object is to provide a method for making such a tape as a preform tape which can be continuous rather than being inherently batch-type in nature.

Another object is to provide such a method with a means for protecting the outer surface of the composite metallic tape while at the same time providing a quality control record of the position of the filaments within the composite metallic tape sandwich.

Still another object is to provide improved apparatus for manufacturing such a tape having an outer protective and quality control surface.

These and other objects and advantages will be more clearly understood from the following detailed description, examples, and the drawings which are meant to be typical of rather than limiting on the scope of the present invention.

Briefly, the composite metallic tape, which is a preform in respect to a subsequently manufactured laminated article using such a tape, includes a single layer of a plurality of aligned high strength, high modulus filaments bonded between the pair of metallic foils. The metallic foils are plastically deformed around at least a portion of substantially each filament to secure the aligned filaments and to hold them spaced one from the other between the foils.

The method by which such a tape is made, in one preferred form, involves coating either the inner surfaces of the foil or the outer surfaces of the filaments or both with a thin, non-metallic adhesive bonding material which will decompose leaving substantially no residue upon heating at a temperature below that at which the foil and filaments will melt and preferably below that at which they will bond together. Then the filaments, sandwiched and aligned between the foils, are pressed between the foils to bond the filaments within the foils through the adhesive bonding material and at the same time to plastically deform the foil around at least a portion of substantially each filament outer surface.

One form of the method of the present invention involves the location of a plastically deformable, strippable film on at least one foil outer surface prior to pressing so that the foil and film are pressed and deformed together to protect the foil outer surface and to reproduce in the film the foil deformation pattern.

Also, there is provided apparatus for continually producing the metallic tape involving a pair of sources of substantially continuous metallic foil, a substantially continuous source of a plurality of aligned filaments and at least one substantially continuous source of the plastically deformable strippable film, along with means to move such foil, filaments and film in the same given direction. In addition, the apparatus includes means to press concurrently the film and foil toward and in contact with the filaments with a force sufficient to deform plastically both the film and the foil around at least a portion of the filament outer surface.

BRIEF DESCRIPTION OF THE DRAWING

FIG. 1 is an isometric, schematic view of one form of the continuous method of the present invention;

FIG. 2 is a fragmentary, cross-sectional view of an assembly of components of the tape of the present invention prior to heating and pressing;

FIG. 3 is a fragmentary, cross-sectional view of one form of the preform tape of the present invention; and FIG. 4 is a perspective, partially sectional view of the tape of the present invention with the protective, replicating films partially stripped away.

DESCRIPTION OF THE PREFERRED EMBODIMENTS

The roll bonding process of the present invention for producing composite metallic tape, and which has continuous capability, involves the disposition of aligned, high modulus, high strength filaments, such as boron filaments or coated boron filaments, between metallic foils to provide a sandwich structure. Such sandwich structure, having a single layer of filaments, is preliminarily bonded through a heat decomposable and removable non-metallic adhesive bonding material, for example, through the application of pressure and relatively low temperatures, to hold the sandwich structure together and to plastically deform the metallic foils around at least a portion of substantially each filament's outer surface. The method preferably includes the application of a strippable, plastically deformable (such as through the application of heat and pressure) film to at least one foil outer surface to provide protection for such outer surface as well as to provide a relatively permanent quality control record of the filament distribution and alignment within the metallic composite tape. Such a filament/metal tape can be considered to be a preform in respect to its subsequent application as laminae in the manufacture of composite metallic articles such as jet engine compressor blades and vanes.

One important feature of the present method in producing the composite metallic tape of the present invention is the use of a relatively small amount of a decomposable adhesive bonding material to hold together, in a tape preform sandwich, the single layer of aligned filaments between a pair of metallic foils. An important characteristic of such a bonding material is that it be capable of decomposing leaving substantially no residue on heating at the relatively low temperatures contemplated in the practice of the method of the present invention. Such a temperature, in any event, is below that at which neither the foil nor filaments will melt. One type of such a bonding material which has been used successfully is acrylic resin in an organic solvent. Such resin solutions are commercially available and are widely used in the brazing art to hold brazing powders together and in place on workpieces being brazed.

It should be understood that the adhesive bonding material can be applied or carried by or with either the metallic foil or the filaments or both depending upon the specific process and apparatus used. For example, in the continuous form of the process, the adhesive bonding material can be applied in a thin film and preliminarily cured on rolls of the metallic foil. Also, the adhesive bonding material can be applied to the filaments, such as prior to their introduction between the metallic foil to form the sandwich structure of the present invention. Alternatively the acrylic resin can be introduced as a separate sheet. For example, preparation of the filaments prior to introduction into the method of the present invention can include the holding of the filaments in alignment and on creels through a backing sheet of acrylic resin. The acrylic resin then functions as the adhesive bonding material when it is introduced into the method of the present invention between the metallic foil.

Irrespective of the method of placement of the adhesive bonding material between the foil inner surfaces and the outer surfaces of the filaments, it is most desirable to limit the amount of acrylic resin to that necessary to bond the pair of metallic foils with the single layer of aligned filaments into the tape preform of the present invention. In this way, as little as possible of the bonding material will have to be removed in subsequent fabrication operations utilizing the tape preform to manufacture laminated metallic composite articles.

The method of the present invention will be more clearly understood by reference to the drawing. FIG. 1 is an isometric, schematic view of one form of the continuous method of the present invention including the application of a pair of plastically deformable strippable protective films on the outside of the pair of metallic foils.

Tape preform 20 of the present invention, having a pair of outer strippable protective films, is provided in FIG. 1 by disposing between a pair of metallic foils 26 a plurality of aligned single or multiple arrays of filaments 22, for example, boron filaments of about 0.004" diameter, from filament creels 24. For example, the filaments can be aligned in given direction D at a spacing of about 150 filaments per inch. Metallic foils 26, which can be fed from rolls 28, in one form are aluminum or aluminum alloy foils, such as about 0.001" thick, precoated with a thin film of acrylic resin. Foils 26 also are aligned in given direction D along with filaments 22.

In the preferred form of the method of the present invention, a plastically deformable, strippable film 30, such as a heat shrinkable polyethylene terephthalate film (one form of which is commercially available as Mylar plastic film) is located outwardly of the pair of metallic foils 26. Such a plastic film, for example, in the thickness range of about 0.001–0.03" is fed from rolls 32 aligned to deposit such film 30 in given direction D. Mylar film has been found to be particularly advantageous because of its relatively low temperature plastic deformability or heat shrinkability and replicatability characteristics.

The composite sandwich structure, comprising a single layer of centrally located aligned filaments between a pair of metallic foils which in turn are sandwiched between strippable plastic film of the type described, and all of which are aligned in given direction D, are then fed between heated pressing rolls 34. Because of the nature both of the adhesive bonding material, when such materials as acrylic resins are selected, and the strippable protective and replicating film, when Mylar is selected, the rolls need be heated only at relatively low temperatures. For example, they can be heated in the range of about 200–500° F. to secure the components in the tape preform of the present invention. This relatively low temperature represents a significant advantage over known compaction processes involving the application of temperature in the range of about 800–1000° F.

The gap between pressing rolls 34 will affect the surface condition of the tape preform. Therefore, in the form of the invention shown in FIG. 1, it is preferred that the gap be maintained at greater than a first distance which is the thickness of a filament plus the thickness of the pair of metallic foils, but less than a second distance which is the first distance plus the thickness of the protective or plastic films or films applied. With the preferred range of material dimensions, the gap will be within the range of about .003"–.03".

In this way, with the heat of the rolls 34 sufficient to plastically deform or heat shrink the strippable film, pressure applied through rolls 34 will result in little, if any, extrusion of metallic foil 26. However, it will cause the foil to deform plastically around at least a portion of the outer surface of the filaments to lock and to space the aligned filaments in position generally in given direction D. It should be understood that the heat may be applied prior to press roll bonding.

During such rolling, film 30 acts as a pressure transmitting means capable of applying pressure substantially uniformly to metallic foil 26 to deform it plastically about filaments 22 as has been described. Application of pressure to the adhesive bonding material holds together metallic foils 26 and filaments 22 into the tape preform of the present invention.

Because of the plastically deformable or heat shrinkable character of the strippable outer film 30, it can be easily removed from the foil outer surface 35 of the tape preform if desired. In the example shown in FIGS. 1 and 4, when two films 30 are applied, one can be stripped and saved, such as on a film collector means as roll 36, as a quality control record. The other is left in place as a protective separator between layers of the tape preform in the event it is either collected and stored or shipped on tape preform roll 38, as shown in FIG. 1, or cut into segments and stacked for storage or shipment. A processor can then strip the remaining film 30 from the tape preform when it is used. This provides such processor with a quality control record duplicating that of the tape preform manufacturer.

With both protective films removed, the tape preform is ready for subsequent fabrication into composite, laminated articles. This can be accomplished through appropriate heat treatment and diffusion bonding procedures which will remove the adhesive bonding material from between the foils and filaments. For example, acrylic binder can be removed by heating for about 15 minutes at about 700° F. in vacuum. At the same time, the stacked laminae are bonded into a reinforced composite article.

As was mentioned before, the volume percentage of filaments attainable through use of the tape preform of the present invention is significantly higher than that attainable by known methods. Of course, the volume fraction of filaments will depend on the diameter of the filament and the thickness of the foil. For example, with the filament diameters in the range of 0.004–0.006", spaced in the range of about 100–180 filaments per inch, in cooperation with metallic foil having a thickness in the range of about 0.001–0.002", filament concentrations in the range of about 40–50 volume percent are obtainable. However, it will be understood that other thicknesses, diameters and spacing can be selected. The preferred tape thickness range for practical fabrication is about 0.003–0.02" utilizing metal foils of about 0.001–0.005" thick with a filament diameter of about 0.003–0.008".

Although the filaments generally are of the same material, it will be understood that various types of filaments can be intermixed as desired to attain the properties selected for the final product. In addition, if desired, filaments of the same material as the foil can be included in order to provide additional spacing between filaments or to adjust tape density.

One specific example in which a tape of the present invention was made to a width of about 6" used a pair of 0.001" thick foils of an aluminum alloy, commercially available as 2024 aluminum alloy, precoated with an acrylic cement. The filaments were aligned boron filaments having a diameter of about 0.004" at a spacing of about 0.0062 inch. A pair of 0.0015" thick Mylar films were applied as described above. Prior to continuous roll pressing while heating at a temperature of about 300° F., the assembly of components appeared as in FIG. 2, which is a fragmentary cross-sectional view of an assembly of the components of the tape of the present invention prior to pressing and heating. Adhesive bonding material 40 which preferably is an acrylic cement is, in this example, carried by foil inner surface 42 and positioned in contact with a portion of outer surfaces 44 of filament 22. However, it will be understood that such bonding material can be placed in contact with both the foil inner surfaces 42 and the filament outer surfaces 44 by a variety of means including the coating of filaments 22 or the positioning of a separate resin film between the filaments and the foils. As shown in FIG. 2, a pair of plastically deformable, strippable films 30 such as of Mylar are positioned to sandwich therebetween the other components of the assembly.

After pressing to compact the assembly of FIG. 2 and to plastically deform the foil around at least a portion of substantially each filament outer surface, there is provided one form of the tape of the present invention as shown in FIG. 3. In the fragmentary, sectional view of FIG. 3, after pressing, the foils 26 are plastically deformed around at least a portion of substantially each filament outer surface, thus securing in substantially spaced apart relationship the aligned filaments 22. Conforming to the outer configuration of foils 26 are the protective and replicating strippable films 30 covering the lateral portions or foil outer surfaces 35 of the tape of the present invention.

In the apparatus form of the present invention, a motor 46 in FIG. 1 can be operably connected with pressing rolls 34 to drive the rolls in given direction D as shown by arrows 48. When the filaments 22 and pair of foils 26 are fed into the gap between rolls 34, optionally along with protective and replicating film 30, the filament from creels 24, the foil from rolls 28 and the film from rolls 32 are moved at substantially the same given rate in the given direction D. To facilitate such rotational movement, the various rolls and creels can be journaled to allow free rotation. Optionally, tensioning devices can be placed in appropriate positions as desired. Alternatively, each of the rolls and creels can be rotated or moved separately such as by separate motors each coordinated with the others to provide appropriate movement in given direction D.

Rolls 34, are shown in FIG. 1 to be mounted in a press 50 so that the roll gap and pressure applied as shown by arrows P can be adjusted in a manner well known in the art. In addition, rolls 34 can be heated, such as by resistance heaters mounted within the rolls and adjustably controlled such as by thermostats or thermocouples.

What is claimed is:

1. Apparatus for continuously producing metallic preform tape comprising:
   first supply means for providing a pair of substantially continuous metallic foils, each foil having an inner and an outer surface;
   means to move each of the pair of foils at a given rate in a given direction;
   second supply means for providing a plurality of substantially continuous filaments;
   means for aligning each of the filaments in a single plane disposed between the pair of metallic foils;
   means to move each of the filaments at a given rate in the given direction;
   third supply means for providing at least one substantially continuous, plastically deformable, strippable film along at least one foil outer surface;

means to move the film at the given rate in the given direction; and pressing means to press concurrently the film and foil toward and in contact with the filaments with a pressing force sufficient to deform plastically both the film and the foil around at least a portion of the filament outer surface.

2. The apparatus of claim 1 including, in addition, means to apply heat to the film and foil, the heat being applied at a temperature less than that which will melt the lowest to melt of the foil and film.

3. The apparatus of claim 1 in which:

the third supply means is a pair of rolls of the film;

the apparatus including, in addition, film collector means to collect one of the pair of strippable films from a foil outer surface.

References Cited
UNITED STATES PATENTS

| | | | |
|---|---|---|---|
| 3,481,802 | 12/1969 | Marcell | 156—436 |
| 2,528,152 | 10/1950 | Landgraf | 156—323 |
| 3,236,714 | 2/1966 | Traut | 156—323 |
| 3,239,396 | 3/1966 | Bohannon, Jr. | 156—436 |
| 3,687,764 | 8/1972 | Rogosch et al. | 156—179 |
| 3,620,880 | 11/1971 | Lemelson | 156—384 |
| 3,472,730 | 10/1969 | Frigstad | 161—144 |
| 3,755,061 | 8/1973 | Schurb | 161—143 |

D. J. FRITSCH, Primary Examiner

U.S. Cl. X.R.

156—179, 247, 323, 555